US 6,648,280 B1

(12) United States Patent
Chong

(10) Patent No.: US 6,648,280 B1
(45) Date of Patent: Nov. 18, 2003

(54) WIRE HARNESS FOR MODULAR OFFICE FURNITURE

(75) Inventor: Jonathan Chee Yeen Chong, Chicago, IL (US)

(73) Assignee: The Marvel Group, Inc., Chicago, IL (US)

( * ) Notice: Subject to any disclaimer, the term of this patent is extended or adjusted under 35 U.S.C. 154(b) by 0 days.

(21) Appl. No.: 09/444,096

(22) Filed: Nov. 22, 1999

Related U.S. Application Data

(60) Provisional application No. 60/109,649, filed on Nov. 24, 1998.

(51) Int. Cl.[7] ................................................. F16L 3/08
(52) U.S. Cl. ..................... 248/68.1; 248/65; 248/71; 248/74.3; 24/115 R; 24/16 PB; 24/537
(58) Field of Search ....................... 248/68.1, 71, 74.2, 248/73, 201, 216.1, 49, 72, 65, 74.1, 74.4; 24/115 R, 16 PB, 537

(56) References Cited

U.S. PATENT DOCUMENTS

| 1,906,874 | A |   | 5/1933  | Platt |
|-----------|---|---|---------|-------|
| 2,938,692 | A | * | 5/1960  | Bosworth et al. .......... 248/74.1 |
| 3,053,930 | A | * | 9/1962  | Mallanik et al. .............. 174/94 |
| 3,353,775 | A |   | 11/1967 | Sebo |
| 3,429,985 | A |   | 2/1969  | Czigler |
| 3,506,227 | A |   | 4/1970  | Jenkins |
| 3,526,381 | A |   | 9/1970  | Pepe |
| 4,470,179 | A |   | 9/1984  | Gollin et al. |
| 4,479,625 | A |   | 10/1984 | Martz |
| 4,566,157 | A | * | 1/1986  | Packendorff .................. 24/536 |
| 4,917,340 | A |   | 4/1990  | Jiiemann et al. |
| 4,936,530 | A |   | 6/1990  | Wollar |
| 4,940,856 | A | * | 7/1990  | Bock ........................... 174/94 |
| 4,958,792 | A |   | 9/1990  | Rinderer |
| D323,106  | S |   | 1/1992  | Daigle et al. |
| 5,458,019 | A | * | 10/1995 | Trevino ..................... 74/502.4 |
| 5,533,696 | A |   | 7/1996  | Laughlin et al. |
| 5,559,922 | A | * | 9/1996  | Arnett ........................ 385/135 |
| 5,725,185 | A |   | 3/1998  | Auclair |
| 5,765,786 | A |   | 6/1998  | Gretz |
| 5,806,811 | A | * | 9/1998  | Viklund et al. ................ 248/49 |
| 5,961,081 | A | * | 10/1999 | Rinderer ..................... 248/68.1 |
| 6,009,223 | A | * | 12/1999 | Arizpe ........................ 385/134 |
| 6,126,121 | A | * | 10/2000 | Akizuki ..................... 248/68.1 |

* cited by examiner

Primary Examiner—Kimberly T. Wood
(74) Attorney, Agent, or Firm—Edgar A. Zarins; Lloyd D. Doigan

(57) ABSTRACT

A modular office system incorporating a detachable clip for harnessing utility wires which run through the furniture. The clip may be mounted to frame members of the furniture at predetermined positions to organize and retain specific wires. The clip includes a pair of inwardly curved fingers which form an expandable slit through which wires may be fed for retention within an opening. A divider may be removably mounted to the clip for dividing the opening thereby facilitating tight retention and organization of wires.

5 Claims, 2 Drawing Sheets

WIRE HARNESS FOR MODULAR OFFICE FURNITURE

RELATED APPLICATIONS

This application claims priority from U.S. Provisional Application No. 60/109,649 filed on Nov. 24, 1998.

BACKGROUND OF THE INVENTION

I. Field of the Invention

This invention relates to modular office furniture and, in particular, to a clip selectively mountable to frame members of the office system to organize and harness utility wires running through the furniture.

II. Description of the Prior Art

Modular office systems have become increasingly popular for their ease of installation and relatively low cost in association with the flexibility such systems provide. Office cubicles, desks and partitions can be easily rearranged or disassembled as personnel requirements change. However, these office systems must also be stable enough to withstand continuous use while also being capable of delivering essential utilities such as electrical power, telephones and computer networking. Because of the modular construction of such office systems, supplying such utilities must be conveniently accomplished. It is also desirable to organize the utility wiring throughout the modular system to facilitate repair or replacement.

Prior known office systems are very rigid in their construction variations. Typically, a frame is provided to which appropriate panels, drawers and desktops are mounted. Wiring may be run through the frame or between panels. However, such prior known systems do not provide an opportunity to alter the system configuration using the same components. These prior known assemblies also have not provided a convenient means for preventing tangling and movement of utility wires such as phone, electrical and computer network wires.

SUMMARY OF THE PRESENT INVENTION

The present invention overcomes the disadvantages of the prior known modular office system by providing a simple harness clip detachably mountable to frame members of the furniture for retaining and separating wires for supplying utilities.

The present invention includes a detachable clip selectively mountable to frame members of the furniture in order to organize and retain the wires which deliver utilities such as telephone, electrical and computer networking. The harness clip has a substantially rectangular body with a central opening. One end of the body includes a throughbore for receiving a fastener to secure the clip to the frame such that the clip extends outwardly from the frame. The body is formed by a pair of inwardly curving expandable fingers to facilitate insertion of wires into the clip. A divider is mountable to the fingers to divide the opening for neatly harnessing the wires or alternatively to separate different groups of wires which run through the clip. A plurality of the clips may be attached to the frame in order to direct wiring through the office furniture.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
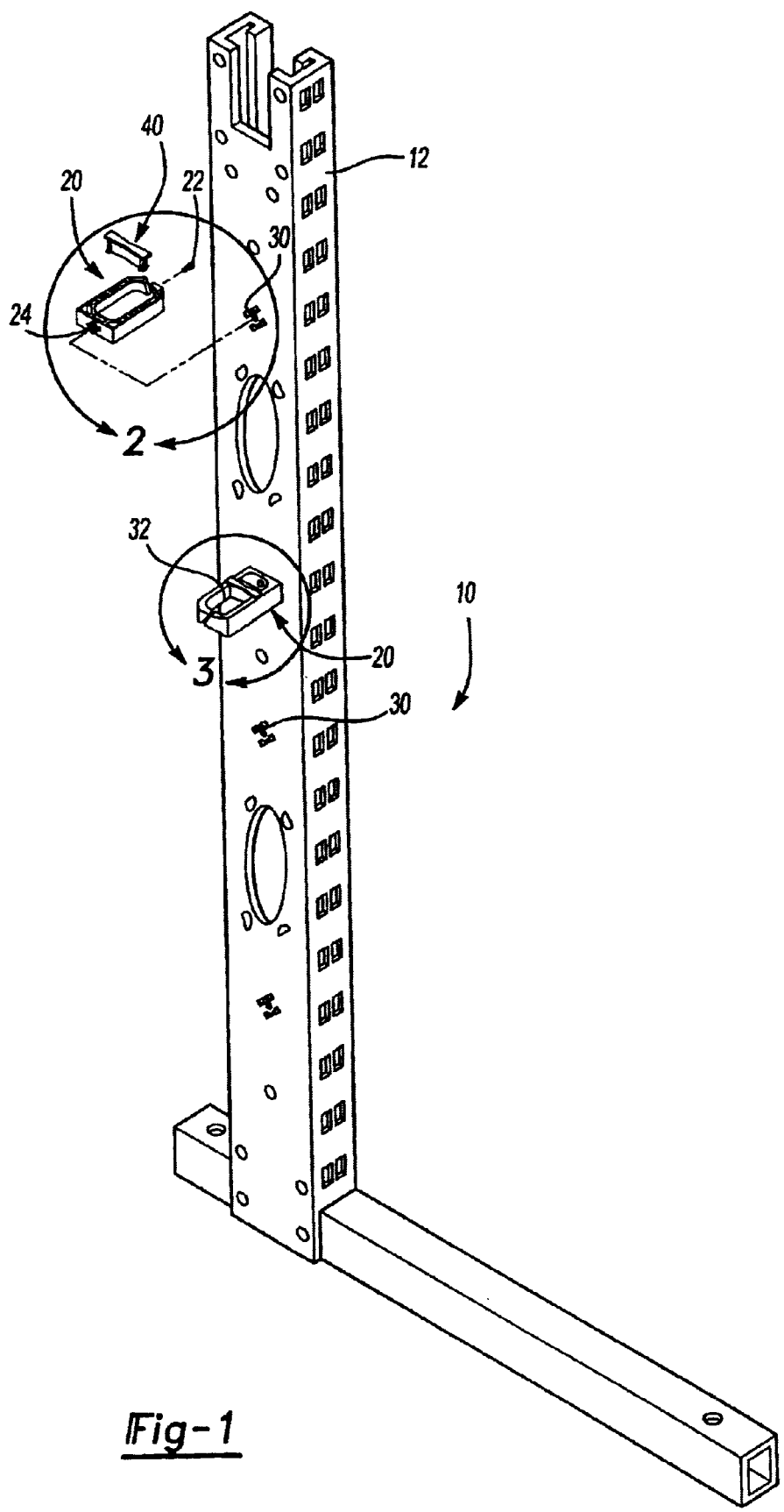
FIG. 1 is a perspective view of a frame member for office furniture embodying the wire harness clip of the present invention.

Referring first to FIG. 1, there is shown a frame member 10 for modular office furniture, capable of selective disassembly and reconfiguration to construct desks, shelves, panel dividers and the like. The present invention will be described in conjunction with an upright support 12 forming a part of the frame 10 although it will be understood that the invention may be used in connection with a variety of frames.

The present invention embodies a clip 20 which is detachably mountable to the upright 12 in order to harness and guide utility wires 14 through the furniture assembly. The harness clip 20 is secured to the upright 12 by a fastener 22 which extends through an aperture 24 formed in an end 26 of the clip 20. In a preferred embodiment, the end 26 of the clip 20 is embossed with a positioning flange 28 which is received within a similarly shaped slot 30 in the upright. The positioning flange 28 is configured to prevent the clip from rotating relative to the upright 12.

Figure 2:
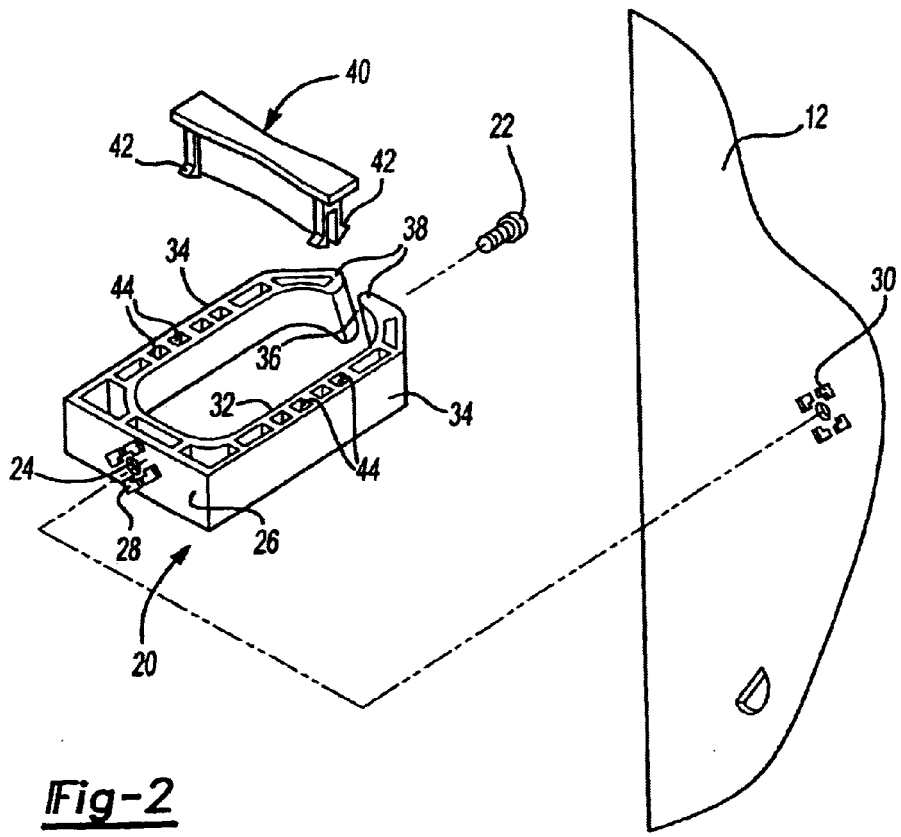
FIG. 2 is an enlarged perspective of a disassembled harness clip.
Figure 3:
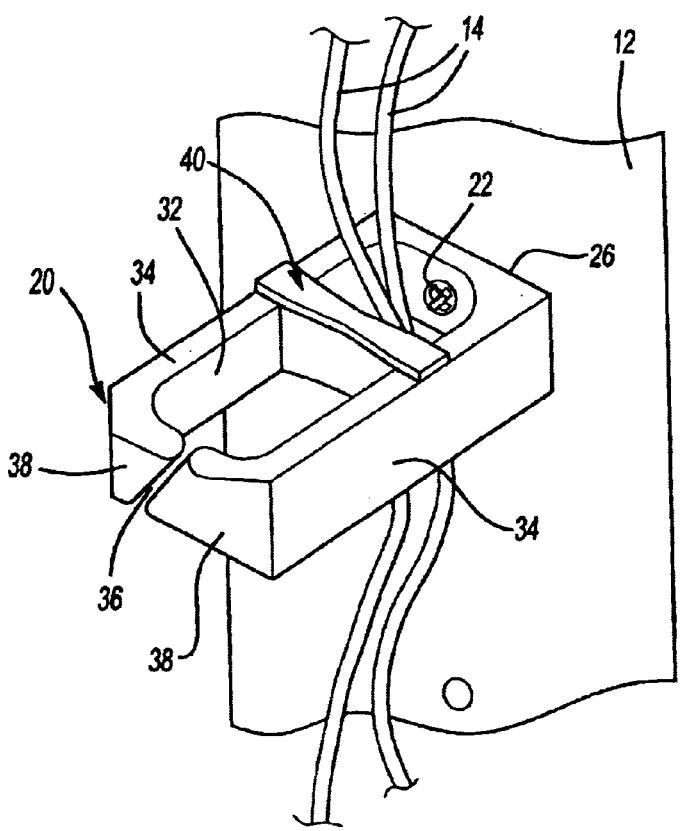
FIG. 3 is an enlarged perspective of the harness clip assembled to the frame member.

As best shown in FIGS. 2 and 3, the harness clip 20 has a substantially rectangular configuration with a central opening 32 through which the wires 14 pass. The clip 20 has a pair of flexible fingers 34 extending from the end 26 which curve inwardly toward each other to form the opening 32. The fingers 34 are outwardly expandable allowing wires 14 to be passed through the slot 36 between the inwardly disposed ends 38 of the fingers 34. This gap or slot 36 allows wires 14 to be laterally passed into the opening 32 rather than having to run the end of the wire 14 axially through the opening 32.

In order to bunch or divide wires 14 passing through the clip 20, a divider 40 can be selectively mounted to the harness 20 to divide the opening 32 into two or more openings. The divider 40 is designed to extend across the opening 32 for mounting to the fingers 34. In a preferred embodiment, the divider 40 has end flanges 42 adapted to be received in any one of a plurality of apertures 44 in the fingers 34. A plurality of apertures 44 are provided so that the opening 32 can be divided into different size apertures in order to snugly retain the wires 14.

The harness clip 20 of the present invention provides complete adjustability to most efficiently guide, collect and organize utility wires within the modular framing 10. The harness 20 may be adjustably positioned as necessary along the upright 12 to guide the wires 14. In addition, the divider 40 allows segregation of wires 14 within the harness 20 such that similar wires can be bunched together. Alternatively, the divider 40 can be used to compactly retain the wires 14 within only a portion of the opening 32.

The foregoing detailed description has been given for clearness of understanding only and no unnecessary limitations should be understood therefrom as some modifications will be obvious to those skilled in the art without departing from the scope and spirit of the appended claims.

What is claimed is:

1. A harness for retaining a plurality of wires, said harness adapted to be detachably mounted to a frame member of a furniture assembly, said harness comprising:

a substantially rectangular body having a central opening adapted to receive the wires, said body including an end wall adapted to lockingly engage the frame member and a pair of spaced apart fingers extending inwardly toward each other forming a slit in said body, said inwardly extending fingers completing said substantially rectangular body and selectively maintaining the wires within said opening, said end wall including a flange for engaging the frame member to prevent rotation of said harness; and a divider member adjustably mounted to said body for selectively dividing said central opening into a pair of openings, said divider member detachably engaging each of said fingers to divide said central opening.

2. The harness as defined in claim 1 wherein said body includes a plurality of apertures and said divider member having end flanges removably received within said apertures to detachably mount said divider member to said body.

3. A harness for retaining a plurality of wires, said harness adapted to be detachably mounted to a frame member of a furniture assembly, said harness comprising:

a substantially rectangular body having a central opening adapted to receive the wires, said body including a pair of spaced apart fingers extending inwardly toward each other forming a slit in said body of the inwardly disposed ends of said fingers, said inwardly extending fingers completing said substantially rectangular body to retard withdrawal of the wires from said opening; and a divider member adjustably mounted to said body by detachably engaging each of said spaced-apart fingers for selectively dividing said central opening into a pair of openings, said divider member having end flanges removably received within apertures formed along said fingers to detachably mount said divider member to said body.

4. The harness as defined in claim 3 wherein said body has an end wall adapted to engage the frame member, said end wall including a flange for engaging the frame member to prevent rotation of said harness.

5. In a frame construction for a modular furniture assembly, said frame construction including a plurality of uprights with embossed openings, the improvement comprising:

a harness for retaining a plurality of wires, said harness detachably mounted to the upright and including a substantially rectangular body having a central opening for receiving the wires, said body including an end wall adapted to lockingly engage the frame member to prevent rotation of said harness relative to the frame member and a pair of spaced apart fingers extending inwardly toward each other forming a slit through said body to substantially complete said rectangular body and a divider member adjustably mounted to said body and detachably engaging each of said fingers for selectively dividing said central opening into a pair of openings.

* * * * *